United States Patent
Gulsun et al.

(10) Patent No.: US 12,299,078 B2
(45) Date of Patent: May 13, 2025

(54) SYSTEM AND METHOD FOR DETECTING ANOMALIES IN IMAGES

(71) Applicant: SIEMENS HEALTHINEERS AG, Forchheim (DE)

(72) Inventors: Mehmet Akif Gulsun, Princeton, NJ (US); Vivek Singh, Princeton, NJ (US); Alexandru Turcea, Bușteni (RO)

(73) Assignee: Siemens Healthineers AG, Forchheim (DE)

( * ) Notice: Subject to any disclaimer, the term of this patent is extended or adjusted under 35 U.S.C. 154(b) by 934 days.

(21) Appl. No.: 17/445,620

(22) Filed: Aug. 23, 2021

(65) Prior Publication Data

US 2022/0076053 A1  Mar. 10, 2022

(30) Foreign Application Priority Data

Sep. 7, 2020 (DE) .................... 10 2020 211 214.2
Sep. 7, 2020 (EP) .................................... 20465555

(51) Int. Cl.
*G06N 3/045* (2023.01)
*G06F 18/10* (2023.01)
(Continued)

(52) U.S. Cl.
CPC .............. *G06F 18/22* (2023.01); *G06F 18/10* (2023.01); *G06N 3/045* (2023.01); *G06N 3/08* (2013.01); *G06V 10/751* (2022.01)

(58) Field of Classification Search
CPC .......... G06N 3/045; G06N 3/08; G06F 18/22; G06F 18/10; G06V 10/751
See application file for complete search history.

(56) References Cited

U.S. PATENT DOCUMENTS

2019/0021677 A1*  1/2019  Grbic .................. G06T 7/11
2019/0172207 A1*  6/2019  Odry .................. G06V 10/82
(Continued)

FOREIGN PATENT DOCUMENTS

CN  111260620 A *  6/2020  .............. G06N 3/08

OTHER PUBLICATIONS

Jiapeng Li, Master Thesis, Visual Inspection of 3D Printed Products, Technische Universiteit Eindoven, PO Box 513 5600 MB Eindhoven, The Netherlands, 21 pages, Oct. 29, 2018 (Year: 2018).*
(Continued)

*Primary Examiner* — Barbara M Level (57) ABSTRACT

Anomalies in images are detected. A generative network and/or an autoencoder ("G/A-Network"), a Siamese network, a first training-dataset of normal images and a second training-dataset of abnormal images are provided. The G/A-network is trained to produce latent data from input images and output images from the latent data, wherein the training is performed with images of the first training-dataset, wherein a loss function is used for training at least at the beginning of training, and the loss function enhances the similarity of the input images and respective output images. The Siamese network is trained to generate similarity measures between input images and respective output images, wherein the training is performed with images of the first training-dataset and the second training-dataset in that images of both training-datasets are used as input images for the G/A-network and output images of the G/A-network are compared with their respective input images by the Siamese network.

12 Claims, 4 Drawing Sheets

(51) Int. Cl.
  *G06F 18/22*  (2023.01)
  *G06N 3/08*  (2023.01)
  *G06V 10/75*  (2022.01)

(56) References Cited

U.S. PATENT DOCUMENTS

| | | | | |
|---|---|---|---|---|
| 2019/0197358 A1* | 6/2019 | Madani | .................. | G06N 3/045 |
| 2019/0197368 A1* | 6/2019 | Madani | .................. | G16H 30/40 |
| 2019/0370662 A1* | 12/2019 | Song | ....................... | G06N 3/088 |
| 2020/0405148 A1* | 12/2020 | Tran | ..................... | A61B 3/0008 |
| 2021/0042607 A1* | 2/2021 | Yan | ......................... | G06F 18/22 |

OTHER PUBLICATIONS

Tang et al. CN 111260620 A published Jun. 9, 2020, English translation (Year: 2020).*
Fernando, Tharindu, et al. "Deep Learning for Medical Anomaly Detection—A Survey." arXiv preprint arXiv:2012.02364 (2020).
Kobayashi, Kazuma et al.: „Unsupervised Brain Abnormality Detection Using High Fidelity Image Reconstruction Networks, In: arXiv, Jun. 2, 2020, URL https://arxiv.org/pdf/2005.12573v2.
Xia, Yingda et al.: "Synthesize then Compare: Detecting Failures and Anomalies for Semantic Segmentation", In: arXiv, Mar. 18, 2020, URL: https://arxiv.org/pdf/2003.08440v1.

* cited by examiner

SYSTEM AND METHOD FOR DETECTING ANOMALIES IN IMAGES

RELATED APPLICATION

This application claims the benefit of DE 10 2020 211 214.2, filed Sep. 7, 2020, and EP 20465555.9, filed on Sep. 7, 2020, which are hereby incorporated by reference in their entirety.

FIELD

A system and a method to detect anomalies in images as well as a method to produce such system and a medical imaging system are described. The anomalies in images are preferably detected with confidence values generated by the system.

BACKGROUND

In the technical field of machine learning, there are sometimes systems used, especially including a deep neural network framework, that are able to learn from a set of training images and generate new images with the same characteristics as the training images. There are multiple embodiments of such systems that differ in their internal setup, but have in common that they include a first neural network ("input network") that converts an input-image into a set of systematic data, e.g., features or an encoding (in the following "latent data") and a second neural network ("output network") that generates images from the latent data. The output images generated from latent data of input images should look similar to the input images.

Such systems are, for example, "generative networks", wherein special embodiments are Generative Adversarial Networks (GAN) or Generative Query Networks (GQN). Other examples are autoencoders, especially Variable Auto-Encoders (VAE). Besides the use for compressing images, they (especially their output network) can also be used for generating photo-realistic objects, e.g., faces, that are entirely fictitious.

An example for a network in the technical field of the embodiment is an autoencoder, a type of artificial neural network architecture that is able to learn a representation (encoding) for an image (typically for dimensionality and/or noise reduction) based on learning data codings in an unsupervised manner. In addition, with the encoding, a reconstructing side (decoding) is trained, where the autoencoder generates output images from the reduced encoding (latent data), wherein the output images should be representations as close as possible to the original input images. Thus, an autoencoder includes an input layer, an encoding network (as input network) a latent space including the encoding (latent data), a decoding network (as output network) and an output layer. Special autoencoders are variational autoencoders (VAEs) that are generative models.

Often, the networks are used for generating images or the detection and classification of images.

One disadvantage of generative networks is that the training is very complicated and may lead to systematical errors.

One serious problem of detection and classification networks is the lack of reliability, especially when deep learning neural networks are used, since the credibility of the output strongly depends on the training. For example, training on noisy or false images could be prone to make mispredictions with high confidence. Especially medical image classification, e.g., anomaly detection tasks, often have an imbalanced data problem which makes the deep learning training process difficult.

Thus, one major disadvantage of detection and classification networks is that there is no measure of reliability of the output. Especially concerning medical images, accurate annotation of medical images requires a great deal of effort and cost and can be subjective due to uncertainty in the images. In addition, medical images could be noisy, e.g., due to dose reduction. Since training a deep learning model on noisy or uncertain ground truth data could lead to false results with a high confidence, as said above, that is especially problematic for clinical decision making.

SUMMARY AND DESCRIPTION

It is the object of the present embodiments to improve the known systems, devices and methods to facilitate an improvement in image processing and especially in training a detection and classification network. One further preferred object is to generate a (confidence) score as a measure of reliability for detection and classification of anomalies in images.

This object is achieved by a method according to the claims, a system according to the claims, a method for detecting anomalies according to the claims, and an imaging system according to the claims.

One embodiment concerns neural networks that are algorithms or models that have to be trained. The basic principles of machine learning are well known to the artisan. Besides an appropriate loss function to solve a specific problem (also well known), the nature of training data and the ground truth (often labels applied to the data) are crucial. Thus, in the case where the loss function is clear, a (trained) neural network, or a group of (trained) neural networks, can be defined by the specific training procedure.

The system for detecting anomalies in images according to one embodiment is trained by a special method.

A method according to one embodiment for producing a system for detecting anomalies in images, especially in medical images, includes the following acts.

In one act, a generative network and/or an autoencoder is provided. Typically, either a generative network or an autoencoder (network) are provided, however, there could be provided also a combination of a generative network and an autoencoder. The generative network and/or the autoencoder (network) are in the following also designated as "G/A-network" to enhance readability. As already said above, the basics of G/A-networks are well known to the artisan. The respective networks include a first neural network ("input network") that converts an input-image in a set of systematic data, e.g., features or an encoding (in the following "latent data" or "latent features") and a second neural network ("output network") that generates images from the latent data. The output images generated from latent data of input images should look similar to the input images. Loss functions for such G/A-networks are well known to the artisan. The G/A-network is especially not yet trained. However, it could also be a G/A-network was already trained, that is now further trained according to the method.

In another act, a Siamese network is provided. A Siamese network (sometimes also designated as "Siamese neural network" or "Twin neural network") is an artificial neural network that uses the same weights while working in tandem on two different input vectors to compute comparable output vectors. Concerning the field of the embodiment, the input vectors are here input images and output images of a generative network, or its latent data (compared with latent data generated from the output images). The output vector of this Siamese network is a similarity measure. Thus, images produced by the G/A-network are compared with their respective original image. The basic principles of training Siamese networks is well known. For example, training can be achieved with triplet loss or contrastive loss. The Siamese network is especially yet not trained. However, it could also be a network already trained, that is now further trained according to the method.

In another act, a first training-dataset including normal images is provided. The expression "normal images" means images of objects in their normal state, wherein "normal" means a predefined state the objects are meant to be or in a correct state. Concerning medical images, "normal" means the healthy state. Concerning product quality, "normal" means the flawless or desired state. The nature of images decides here which sort of problem the system will solve later. It is preferred that the images are medical images (for an application in medicine) or images of products (for quality management). For example, the images of the first dataset are images of a healthy organ or body region.

The images of the first training-dataset are preferably labeled as normal images to provide a ground truth. However, alone the knowledge that images of the first dataset are applied for training could be used as ground truth.

In another act, a second training-dataset including abnormal images is provided. The expression "abnormal images" means images of objects in a state that differs from the normal state, i.e., a state the objects are not meant to be or in an incorrect state. Concerning medical images, "abnormal" means a pathological state. Concerning product quality, "abnormal" means a faulty or defective state. It is clear that the abnormal images show the same sort of objects as the normal images with the difference that the objects are now not normal. Following the preceding example, the images of the second dataset are images of a non-healthy organ or body region.

The images of the second training-dataset are preferably labeled as abnormal images to provide a ground truth. However, alone the knowledge that images of the second dataset are applied for training could be used as ground truth.

In another act, the G/A-network is trained to produce latent data from input images and output images from the latent data, wherein the training is performed with images of the first dataset, wherein a loss function is used for training at least at the beginning of training (later the Siamese network could possibly replace the loss function), the loss function enhancing the similarity of the input images and respective output images. The G/A-network uses its input network to generate latent data, especially an encoding or feature-set, from the normal images of the first training-dataset. In order to compare input and output of the G/A-network later, the output network generates images from the latent data.

Suitable loss functions enhancing the similarity of the input images and respective output images are well known by the artisan, e.g., reconstruction loss functions concerning the similarity of images or perceptual loss functions concerning the latent data of images. Regarding perceptual loss, the output images have to be processed by the first network (or a network identical to the first network) again to generate latent data, especially an encoding or feature-set, of the output images. Thus, the G/A-network is trained to learn how to reconstruct examples from normal images, e.g., a majority class which often includes the normal examples for a medical anomaly detection task. The G/A-network could, e.g., be one of the architectures such as a variational autoencoder or generative adversarial network.

It should be noted that a G/A-network does not intend to produce an identical output of images, i.e., an output where the pixels of the input images are processed pixel-wise. The latent data always represents features or an encoding of the image that does not include the direct values and/or coordinates of pixels. Thus, by training on normal images, only (e.g., images of a healthy organ), the G/A-network does not "understand" abnormal states of the object. Thus, output images of abnormal images (e.g., images of a pathological organ) processed by the G/A-network later (not during training) will have a worse similarity with their respective input images than when processing normal images. Preferably, the G/A-network is trained on a large training dataset with report statements where no explicit annotation is required.

In another act, the Siamese network is trained to generate similarity measures (also designated as "similarity metric") between input images and respective output images, wherein the training is performed with images of the first training-dataset and the second training-dataset in that images of both datasets are used as input images for the G/A-network and output images of the G/A-network are compared with their respective input images by the Siamese network. Surely, the Siamese network must know, whether a normal or an abnormal image is inputted to learn differences of the similarity. As said above, direct labels of the images can be used or the used training-dataset itself is the label. The basic principles of generating a similarity measure are well known, wherein the similarity measure is typically a value that is higher the better similarity is and lower at inferior similarity. In short: The task for the Siamese network is to learn whether two input images are similar or different and, thus, a similarity metric is learned based on the reconstructed output of a G/A-network. It is preferably trained to maximize the similarity measure when normal sample and its reconstruction is provided and to minimize the similarity measure when abnormal sample and its reconstruction is provided.

The similarity measures generated by the Siamese network can preferably be used in an active learning setup to guide annotation process with recommendations, especially for a further training of the G/A-network.

A system for detecting anomalies in images according to one embodiment includes the following components:
  a generative network and/or an autoencoder trained by the method according to one embodiment,
  a Siamese network trained by the method according to one embodiment. This Siamese network is connected to the G/A-network such that it is able to compare input images with their output images generated by the G/A-network.

Although there might be alternative setups for training, it is preferred that this setup (or any other setup referring to the system described below) is also used for training the networks.

A method for detecting anomalies in images according to one embodiment includes the following acts:
  providing an image as input for a system according to the embodiment,
  receiving a similarity measure for this image (by the output of the Siamese network),
  if the similarity measure lies beyond a predefined similarity threshold, then classify an abnormality in the image, especially depending on the area of the abnormality, wherein this can preferably be achieved with a classification network described in the following.

Optionally, input images can be processed multiple times to generate a plurality of output images and respective similarity measures, wherein this multiple processing is preferably done with any input image. Thus, there are two or more similarity metrics for any input image. With that it is possible and advantageous to generate a probability distribution (or a non-normalized similarity distribution) over the similarity measures.

It is clear that "beyond" a threshold means "in a region of abnormal events." Concerning a typical similarity measure, where good similarities lead to a high measure and bad similarities lead to a low measure, "beyond" means below the threshold.

A control device according to one embodiment for controlling an imaging system includes a system according to the embodiment. Alternatively or additionally, it is designed to perform the method according to the embodiment. The control device may include additional units or devices for controlling components of an imaging system, e.g., a sequence control unit for measurement sequence control, a memory, a transmission device that generates, amplifies and transmits radiation, a magnet system interface, a radiation reception device to acquire signals and/or a reconstruction unit to reconstruct image data.

An imaging system according to the embodiment includes a control device according to the embodiment. Thus, an imaging system according to the embodiment includes a system according to the embodiment and/or is designed to perform a method according to the embodiment. Preferred imaging systems are medical imaging systems, e.g., computer tomography (CT) systems or magnetic resonance imaging systems.

Some units or modules of the system or the control device mentioned above can be completely or partially realized as software modules stored in a non-transitory media and run or executed by a processor of a system or a control device. A realization largely in the form of software modules can have the advantage that applications already installed on an existing system can be updated, with relatively little effort, to install and run these units of the present application. The object of the embodiment is also achieved by a computer program product with a computer program that is directly loadable into the memory of a device of a system or a control device of an imaging system, and which includes a program to perform the acts of the method when the program is executed by the control device or the system. In addition to the computer program, such a computer program product can also include further parts such as documentation and/or additional components, also hardware components such as a hardware key (dongle etc.) to facilitate access to the software.

A computer readable medium such as a memory stick, a hard-disk or other transportable or permanently-installed carrier can serve to transport and/or to store the executable parts of the computer program product so that these can be read from a processor unit of a control device or a system. A processor unit can include one or more microprocessors or their equivalents.

Particularly advantageous embodiments and features of the embodiment are given by the dependent claims, as revealed in the following description. Features of different claim categories may be combined as appropriate to give further embodiments not described herein.

According to a preferred method, the G/A-network is trained in that an input image is compared with its output image generated by the G/A-network. The images can be compared directly or indirectly by data generated by identical processes from the images. It is preferred that the comparison is performed by using a reconstruction loss function. It is preferred to compare the images directly (comparison of the image-data). Alternatively or additionally, data generated by a first network of the G/A-network, especially latent data, is compared with data of output images additionally processed by the first network, especially by using a perceptual loss function. The first network of the G/A-network is preferably an encoder network so that said data is an encoding or a feature-set of the image. It is preferred that the training is assisted by a (second) Siamese network already trained to replace a reconstruction loss function and/or a perceptual loss function.

According to a preferred method, the Siamese network is trained to generate similarity measures between the input images and respective output images directly by comparing the images (comparison of the image-data). Alternatively or additionally, the Siamese network is trained to generate similarity measures between the input images and respective output images indirectly with data generated by a first network of the G/A-network, especially latent data, is compared with data of output images additionally processed by the first network. The first network of the G/A-network is preferably an encoder network so that said data is an encoding or a feature-set of the image.

According to a preferred method, the G/A-network is a generative adversarial network (GAN) or an autoencoder, especially a variable autoencoder (VAE). A generative adversarial network (GAN) is a class of machine learning frame-works, where two neural networks contest with each other.

According to a preferred method, the Siamese network is trained to generate a similarity threshold on the similarity measures, wherein the similarity threshold indicates the processing of an abnormal image by the G/A-network. It preferably learns the threshold on the similarity measure from the training-datasets by using both normal and abnormal examples. This is very advantageous for a final binary decision ("normal" or "abnormal"), but not necessary when ranking samples by their similarity. It is clear that the threshold is chosen such that it separates normal images from abnormal images.

According to a preferred method, the Siamese network is designed such that it normalizes similarity measures, wherein the normalization is preferably based on a validation dataset. A validation dataset is a separate training dataset. Validation data of the validation dataset are mainly used to tune hyperparameters of a network as well as monitor the behavior of loss during the training. Normalized similarity measures can be designated as "confidence score." From this confidence score (or with otherwise comparing the similarity measure with predefined values), automated annotations from high confidence predictions can be made. Using the similarity measure as a confidence score has the advantage that clinicians can be provided a measure of reliability of the system output.

Preferably, the system (and/or the training setup) includes a classification network connected to the output of the Siamese network, preferably such that it receives a similarity measure in the case that it lies beyond a predefined similarity threshold, especially only in that case so that normal images (with a high similarity measure) are not classified. The classification network receives output images or latent data of the G/A-network or input images as input and classifies its input data. For example, normal images of a healthy coronary artery are not classified, since they have a high similarity measure (the G/A-network is trained on healthy coronary arteries), while abnormal images of diseased coronary arteries have a low similarity measure. Thus, the image of a diseased coronary artery is preferably further classified into "Calcified", "Non-Calcified" or "Mixed" categories.

According to a preferred method, additionally, a classification network is trained such that it is able to classify images by using similarity measures generated by the Siamese network and/or data generated by the G/A-network. Preferably, the classification network is trained by using images of the second training-dataset and/or the latent data of the G/A-network and/or the output images of the G/A-network generated from the second training-dataset as input feature set. Preferably, the classification network is trained by using the latent data and/or the output images of the G/A-network and/or the similarity measure of the Siamese network. The similarity measure is preferably used to filter out "normal examples". Thus, the preferred method can be extended to support multi-class prediction by training a classifier on abnormal examples.

According to a preferred method, the Siamese network is trained to generate a spatially resolved similarity measure of images. This means that it is monitored, where in the picture the similarity is high and where it is low. This can especially be achieved by segmenting an image into sub-pictures and/or segmenting a stack of images (e.g., a 3D image) into image-slices and/or using the coordinates of pixels of the images. It is preferred that a classification depends on an area in an image and the respective similarity measure of this area. For example, if a low similarity is found in a region, where normally the heart is, then it is assumed that there is a disease of the heart.

According to a preferred method, the training is an end-to-end training. Alternatively or additionally, results generated by the Siamese network are used to further train the G/A-network and/or results generated by the G/A-network are used to further train the Siamese network.

In a preferred system according to one embodiment, components of the system are part of a data-network, wherein preferably the data-network and a (especially medical) imaging system are in data-communication with each other, wherein the data-network preferably includes parts of the internet and/or a cloud-based computing system, wherein preferably the system according to the embodiment or a number of components of this system is realized in this cloud-based computing system. For example, the components of the system are part of a data-network, wherein preferably the data-network and a medical imaging system which provides the image data are in communication with each other. Such a networked solution could be implemented via an internet platform and/or in a cloud-based computing system.

The method may also include elements of "cloud computing." In the technical field of "cloud computing," an IT infrastructure is provided over a data-network, e.g., a storage space or processing power and/or application software. The communication between the user and the "cloud" is achieved by data interfaces and/or data transmission protocols.

In the context of "cloud computing," in a preferred embodiment of the method according to one embodiment, provision of data via a data channel (for example, a data-network) to a "cloud" takes place. This "cloud" includes a (remote) computing system, e.g., a computer cluster that typically does not include the user's local machine. This cloud can be made available in particular by the medical facility, which also provides the (medical) imaging systems. In particular, the image acquisition data is sent to a (remote) computer system (the "cloud") via a RIS (Radiology Information System) or a PACS (Picture Archiving and Communication System).

Within the scope of a preferred embodiment of the system according to one embodiment, the above-mentioned components are present on the "cloud" side. A preferred system further includes, a local computing unit connected to the system via a data channel (e.g., a data-network, particularly configured as RIS or PACS). The local computing unit includes at least one data receiving interface to receive data. Moreover, it is preferred if the local computer additionally has a transmission interface in order to send data to the system.

With one embodiment, annotation processes can be made more efficient and less costly via active learning where the Siamese network flags cases with high uncertainty from an unlabeled pool for annotation or outlier cases with high uncertainty from a labeled pool for further inspection.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF THE PREFERRED EMBODIMENTS

Figure 1:
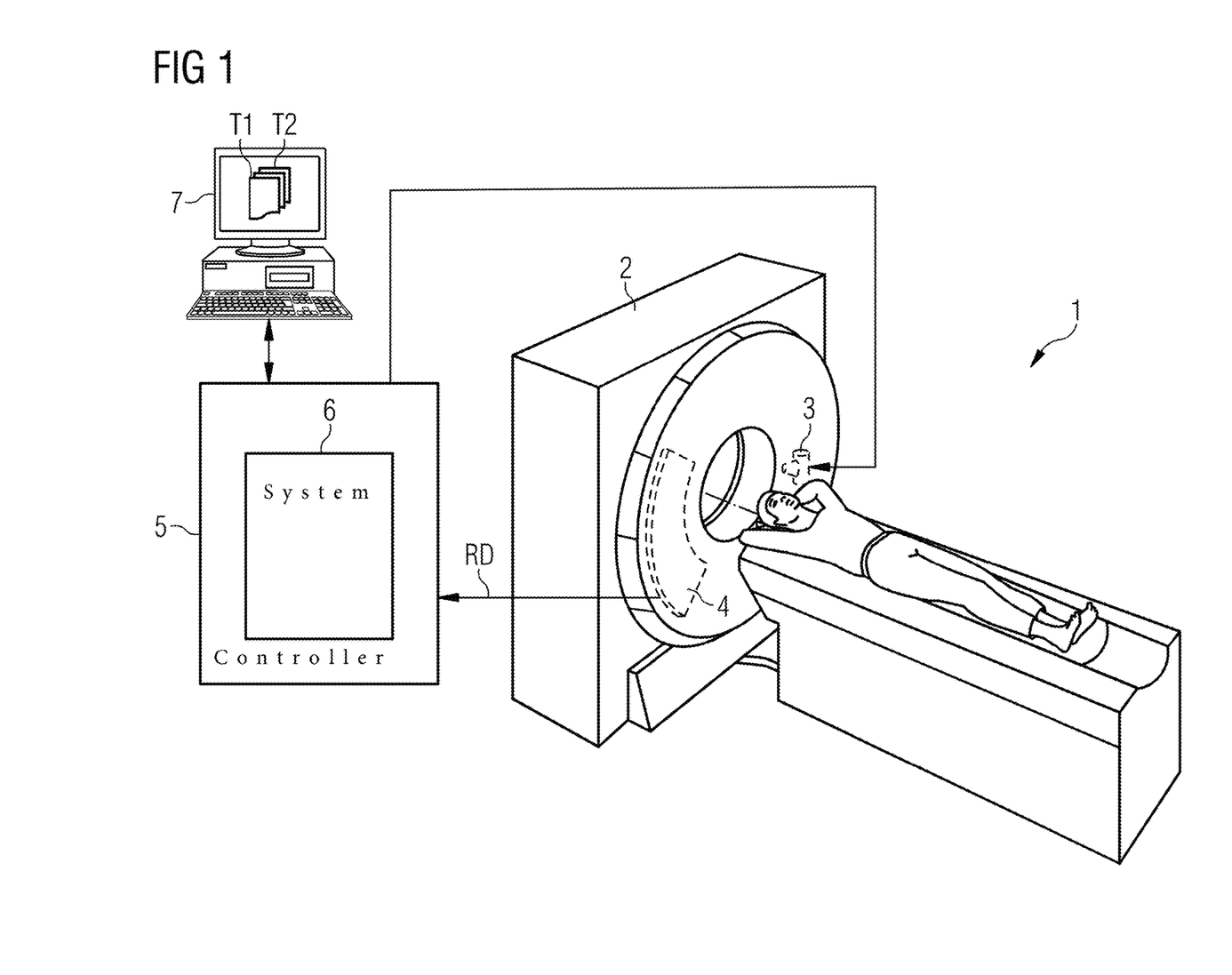
FIG. 1 shows a simplified CT system according to an embodiment.

FIG. 1 shows a simplified computer tomography system 1 with a control device (controller) 5 including a system 6 for carrying out the method according to one embodiment. The computer tomography system 1 has in the usual way a scanner 2 with a gantry, in which an x-ray source 3 with a detector 4 rotates around a patient and records raw data RD that is later reconstructed to images by the control device 5.

It is pointed out that the exemplary embodiment according to this figure is only an example of an imaging system and the embodiment can also be used on theoretically any imaging system that is used in medical and non-medical environment. Likewise, only those components are shown that are essential for explaining the embodiment. In principle, such imaging systems and associated control devices are known to the person skilled in the art and therefore do not need to be explained in detail.

The imaging system (here the CT system 1) records images that are used for training of the system 6 according to one embodiment and, after training, images of the imaging system are processed by the system 6 according to an embodiment.

For creating a training dataset (first training-dataset T1 and second training-dataset T2), a user can examine CT-images and label them to be normal images or abnormal images (e.g., images showing disease induced changes). The examination can be performed on a terminal 7 that is able to communicate with the control device 5. This terminal can also be used to examine results of the system 6 according to the embodiment.

Figure 2:
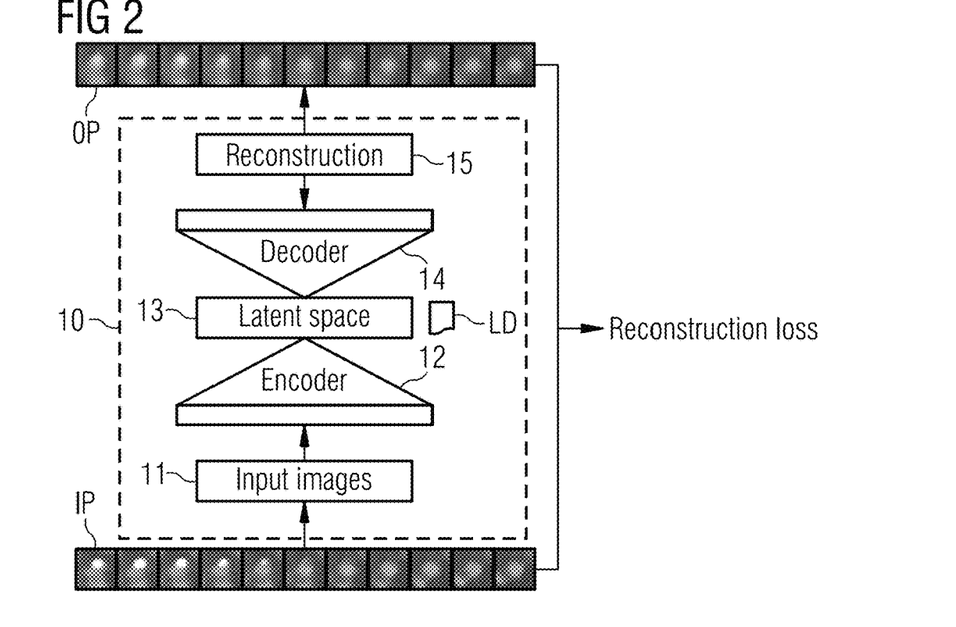
FIG. 2 shows an embodiment for training of a G/A-network with an estimation of a reconstruction loss.

FIG. 2 shows an embodiment for training of a G/A-network 10, here an autoencoder 10, with an estimation of a reconstruction loss. The G/A-network is in this example preferably a variational autoencoder (VAE) and includes an input layer 11, an encoding network 12 as first network 12, a latent space 13 (can also be designated as "feature space") for storing the latent data LD, a decoding network 14 as second network 14 and an output layer 15.

Input images IP are provided to the input layer 11 and encoded by the encoding network 12 by forming latent data LD (e.g., a feature-set) in the latent space 13. The latent data LD is than again decoded by a decoding network 14 and the output layer provided output images OP that should be similar to the input pictures (but not identical with them).

By comparing the input images IP with their respective output images OP, it could be determined how good the G/A-network 10 is tuned. The training can be achieved by applying a loss function maximizing the similarity.

In this example, input images IP are compared with their output images OP directly by a reconstruction loss function.

Figure 3:
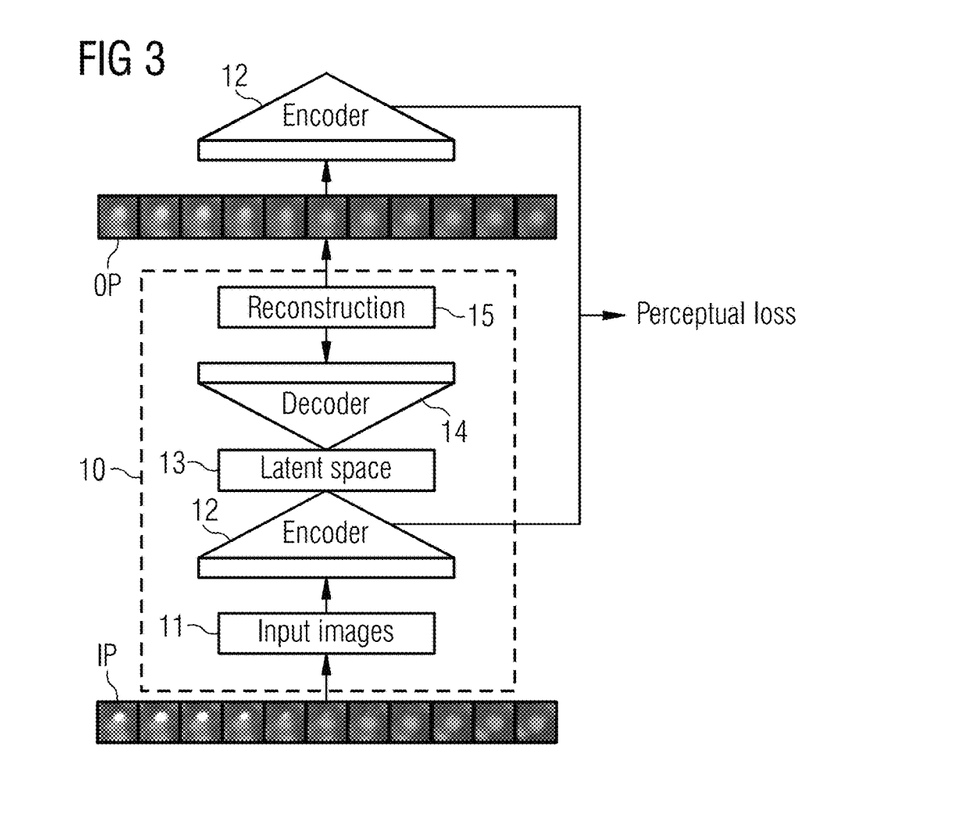
FIG. 3 shows an embodiment for training of a G/A-network with an estimation of a perceptual loss.

FIG. 3 shows an embodiment for training a G/A-network 10 with an estimation of a perceptual loss. The network is similar to the G/A-network 10 shown in FIG. 2 with the difference that the output images OP are again encoded by an encoding network 12. This encoding network 12 should include identical preferences as the encoding network 12 encoding the input pictures and could be the same.

In this example, encoded input images IP are compared with encoded output images OP by a perceptual loss function.

Figure 4:
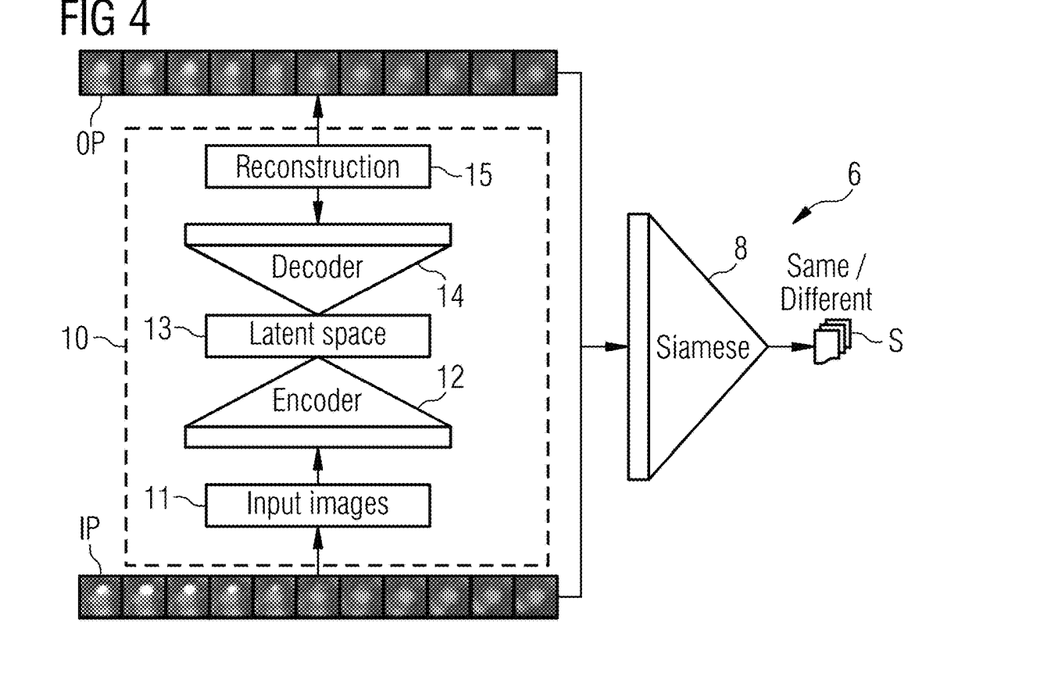
FIG. 4 shows a schematic embodiment of a system including a Siamese network.
Figure 7:
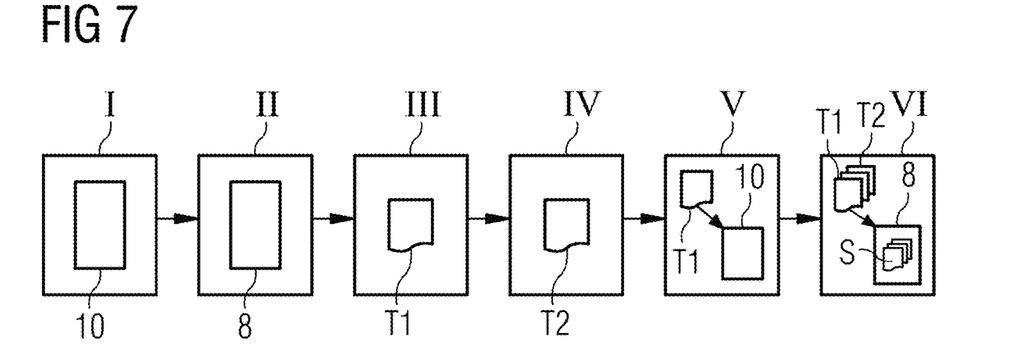
FIG. 7 shows a block diagram of the process flow of a preferred training method according to an embodiment.

FIG. 4 shows a schematic embodiment of a system according to one embodiment including a Siamese network 8. A G/A-network 10 (as shown in FIG. 2) generates output images OP from input images IP. In contrast to FIG. 2, a Siamese network 8 compares the input images IP with their respective output images OP. In the training phase, the Siamese network 8 is trained with normal and abnormal images and is able to determine a similarity measure S (also designated as "similarity metric"). An example for a training procedure is shown in FIG. 7. The output of the Siamese network 8 is the similarity measure S.

Figure 5:
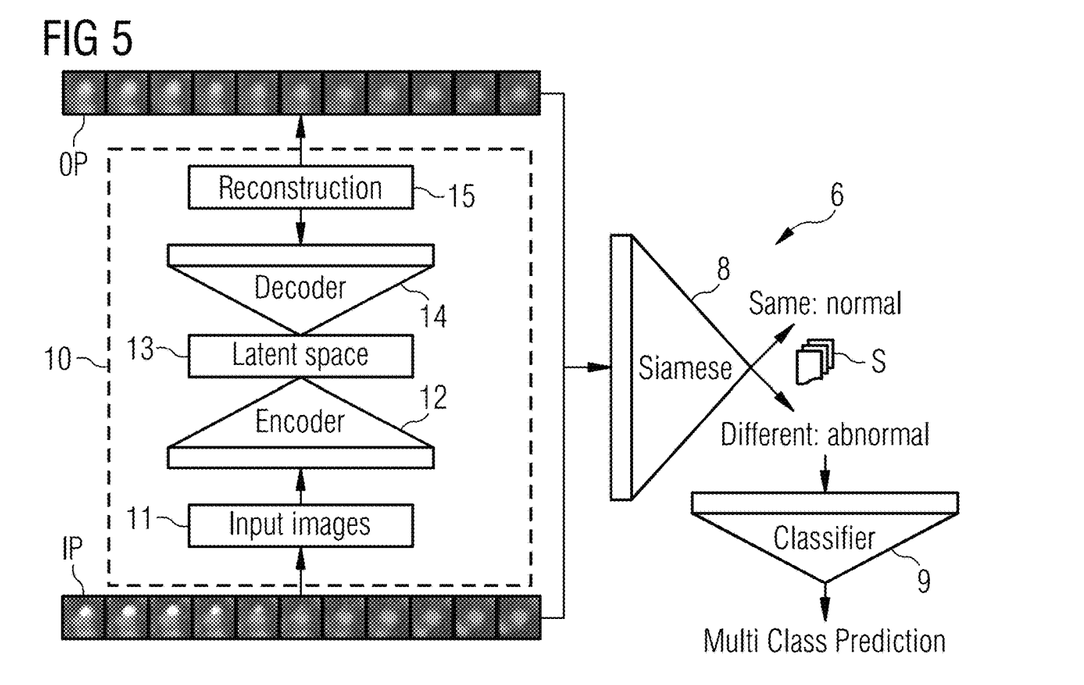
FIG. 5 shows a schematic embodiment of a system including a Siamese network and a classification network.

FIG. 5 shows a schematic embodiment of a system 6 according to an embodiment including a Siamese network 8 and a classification network 9. A setup as shown in FIG. 4 is enlarged by a classification network 9 that processes the results of the Siamese network 8. Here, normal results with a high similarity are not processed by the classification network 9. However, when the similarity drops under a certain predefined threshold, the classification network 9 processes the results of the Siamese network 8 and derives possible classifications for the input images IP (that are then abnormal and show, e.g., pathologies).

Figure 6:
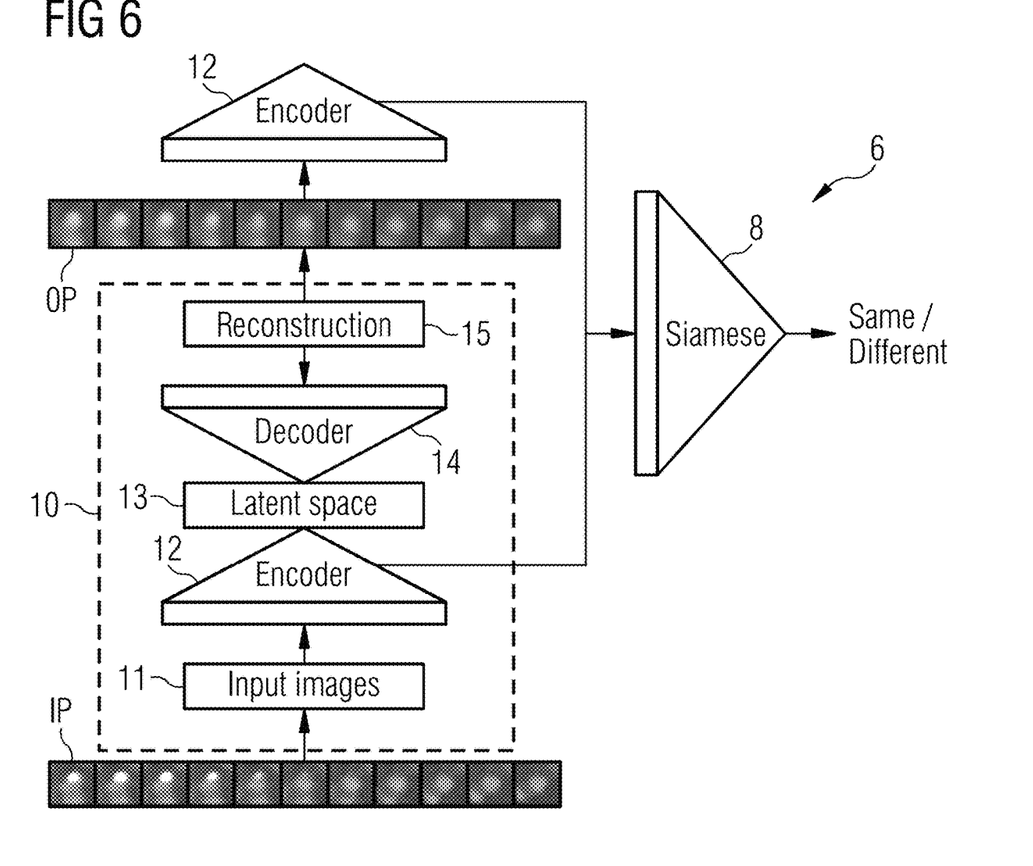
FIG. 6 shows a schematic embodiment of a system including a Siamese network.

FIG. 6 shows a schematic embodiment of a system 6 according to another embodiment including a Siamese network 8. This example is similar to the example shown in FIG. 4 with the difference that encoded input images IP are compared with encoded output images OP by the Siamese network 8.

FIG. 7 shows a block diagram of the process flow of a preferred training method according to one embodiment.

In act I, an (untrained) G/A-network 10 is provided.

In act II, an (untrained) Siamese network 8 is provided.

In act III, a first training-dataset T1 including normal images is provided.

In act IV, a second training-dataset T2 including abnormal images is provided.

In act V, the G/A-network 10 is trained to produce latent data LD from input images IP and output images OP from the latent data LD (see e.g., FIG. 2), wherein the training is performed with images of the first training-dataset T1, wherein a loss function is used for training at least at the beginning of training, the loss function enhancing the similarity of the input images IP and respective output images IP.

In act VI, the Siamese network 8 is trained to generate similarity measures S between input images IP and respective output images OP, wherein the training is performed with images of the first training-dataset T1 and the second training-dataset T2 in that images of both training-datasets T1, T2 are used as input images for the G/A-network 10 and output images OP of the G/A-network 10 are compared with their respective input images IP by the Siamese network 8.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The mention of a "unit" or a "device" does not preclude the use of more than one unit or device.

The invention claimed is:

1. A method for training a network for detecting anomalies in medical images, the method comprising:
providing a generative network,
providing a Siamese network,
providing a first training dataset comprising medical images of a healthy organ or tissue,
providing a second training-dataset comprising medical images of a non-healthy organ or tissue,
training the generative network to produce latent data from input medical images and output medical images from the latent data, wherein the training is performed with images of the medical images of the healthy organ or tissue, wherein a loss function is used for training at least at a beginning of training, the loss function enhancing a similarity of respective input images and respective output images, and
training the Siamese network to generate similarity measures between respective input images and respective output images of the trained generative network, wherein the training is performed with medical images of the healthy organ or tissue and medical images of the non-healthy organ or tissue that are used as input to the trained generative network, wherein a respective similarity measure below a similarity threshold indicates that the trained generative network input a medical image of the non-healthy organ or tissue and wherein a similarity measure at or above the similarity threshold indicates the trained generative network input a medical image of the healthy organ or tissue, wherein the Siamese network is further configured to normalize the similarity measures, inputting an input medical image into the trained generative network, outputting, by the trained generative network an output medical image, generating, by the trained Siamese network, a similarity measure for the input medical image and the output medical image, and classifying, by a classification network, a pathology in the input medical image when the similarity measure is below the similarity threshold.

2. The method according to claim 1, wherein training of the generative network comprises comparing one of the input images with a corresponding one of the output images generated by the generative network using a reconstruction loss function or a perceptual loss function.

3. The method according to claim 2, wherein the generative network is trained by the comparison of data, wherein the training is assisted by a second Siamese network trained to replace a reconstruction loss function or a perceptual loss function.

4. The method according to claim 1, wherein the Siamese network is trained to generate similarity measures between the input images and the respective output images directly by comparing the images or indirectly by comparing a latent space generated by the generative network.

5. The method according to claim 1, wherein the generative network is a generative adversarial network (GAN) or a variable autoencoder (VAE).

6. The method according to claim 1, wherein the Siamese network is trained to identify the similarity threshold.

7. The method according to claim 1, wherein the normalization is based on a validation dataset.

8. The method according to claim 1, wherein the classification network is trained by using at least images of the second training-dataset generated by the generative network from the second training-dataset.

9. The method according to claim 1, wherein the Siamese network is trained to generate a spatially resolved similarity measure of images, and wherein the classifying is based on an area in an image and the respective similarity measure of the area.

10. The method according to claim 1, wherein the training of the generative network and the Siamese network is an end-to-end training or wherein results generated by the Siamese network are used to further train the generative network or wherein results generated by the generative network are used to further train the Siamese network.

11. A method for detecting anomalies in images, the method comprising:

inputting an input medical image of an organ or tissue multiple times into a trained generative network, wherein the generative network to produce latent data from a medical image and output an image from the latent data, wherein the generative network is trained with images of healthy images of the organ or tissue, wherein a loss function is used for training at least at a beginning of training the generative network, the loss function enhancing a similarity of the input images and respective output images, outputting, by the trained generative network a plurality of output medical image, generating, by a trained Siamese network, a similarity measure for each of plurality of the input image and the output medical image, wherein the Siamese network is trained by inputting healthy and non-healthy medical images of the organ or tissue to the generative network and comparing the output images of the generative network with their respective input images, wherein a similarity measure below a similarity threshold indicates that the trained generative network input a non-healthy medical image of the organ or tissue and wherein a similarity measure at or above the similarity threshold indicates the trained generative network input a healthy medical image of the organ or tissue, wherein a probability distribution is generated for the plurality of similarity measures, and classifying a pathology in the input medical image when probability distribution for the plurality of similarity measures is below the similarity threshold.

12. An imaging system comprising:

a processor configured to execute a computer program;

a memory configured to store the computer program, the computer program comprising instructions to:

acquire a medical image of an organ or tissue, apply a generative network trained to produce latent data from the medical image and output an output image from the latent data, wherein the training of the generative network was performed with healthy medical images of an organ or tissue, wherein a loss function was used for training, the loss function being a similarity of input healthy medical images and respective output images, apply a Siamese network to generate a similarity measure between the medical image and the output image, wherein the training of the Siamese network comprises inputting healthy and non-healthy medical images of the organ or tissue to the generative network and comparing the output images of the generative network with their respective input images, wherein a respective similarity measure below a similarity threshold indicates that the trained generative network input a non-healthy medical image of the organ or tissue and wherein a similarity measure at or above the similarity threshold indicates the trained generative network input a healthy medical image of the organ or tissue, wherein the Siamese network is further configured to normalize the similarity measure, classify a pathology in the input medical image of the organ or tissue when the similarity measures is below the similarity threshold.

* * * * *